(12) United States Patent
Choi et al.

(10) Patent No.: US 11,742,900 B2
(45) Date of Patent: Aug. 29, 2023

(54) SYSTEM AND METHOD FOR INTERFERENCE CANCELLATION

(71) Applicant: Kumu Networks, Inc., Sunnyvale, CA (US)

(72) Inventors: Jung-Il Choi, Sunnyvale, CA (US); Mayank Jain, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/077,995

(22) Filed: Dec. 8, 2022

(65) Prior Publication Data

US 2023/0188182 A1    Jun. 15, 2023

Related U.S. Application Data

(60) Provisional application No. 63/403,658, filed on Sep. 2, 2022, provisional application No. 63/362,289, filed on Mar. 31, 2022, provisional application No. 63/316,199, filed on Mar. 3, 2022, provisional application No. 63/287,787, filed on Dec. 9, 2021.

(51) Int. Cl.
*H04B 7/0413* (2017.01)
*H04B 17/12* (2015.01)

(52) U.S. Cl.
CPC ........... *H04B 7/0413* (2013.01); *H04B 17/12* (2015.01)

(58) Field of Classification Search
CPC .............................. H04B 7/0413; H04B 17/12
See application file for complete search history.

(56) References Cited

U.S. PATENT DOCUMENTS

| 2016/0226653 | A1* | 8/2016 | Bharadia | H04B 1/525 |
| 2017/0085398 | A1 | 3/2017 | Liu | |
| 2018/0205533 | A1 | 7/2018 | Lee et al. | |

OTHER PUBLICATIONS

"New Services & Applications with 5G Ultra-Reliable Low Latency Communications", 5G Americas Whitepaper, Nov. 2018.
"On NR Full Duplex", Qualcomm, RWS-210026, 3GPP TSG RAN Rel-18 workshop Electronic Meeting, Jun. 28-Jul. 2, 2021, Agenda Item: 4.3.
"Study on Evolution of NR Duplex Operation", 3GPP TSG RAN#94-e, Electronic Meeting, Dec. 6-17, 2021.
Cutrer, David , "Boosting 5G Network Performance Using Self Interference Cancellation", Microwave Journal, Feb. 11, 2022.

(Continued)

*Primary Examiner* — Rahel Guarino
(74) *Attorney, Agent, or Firm* — Jeffrey Schox; Samuel Rosenthal

(57) ABSTRACT

A system for interference cancellation, preferably including a plurality of analog taps. Each analog tap preferably includes one or more scalers and/or phase shifters, and can optionally include one or more delays. The system for interference cancellation can optionally be integrated with and/or otherwise associated with a MIMO communication system. A method for interference cancellation, preferably including: determining operation parameters and operating based on the determined parameters. The method is preferably performed using the system for interference cancellation (e.g., and/or an associated MIMO communication system), but can additionally or alternatively be performed using any other suitable system.

20 Claims, 16 Drawing Sheets

(56) References Cited

OTHER PUBLICATIONS

Islam, Md Atiqui, "A Unified Beamforming and A/D Self-Interference Cancellation Design for Full Duplex MIMO Radios", Submitted on Jun. 25, 2019, arXiv: 1906.10656, https://arxiv.org/abs/1906.10656.

Li, Xudong, et al., "Multi-Tap Analog Self-Interference Cancellation for Full-Duplex Communications", 2017 IEEE/CIC International Conference on Communications in China (ICCC).

* cited by examiner

US 11,742,900 B2

SYSTEM AND METHOD FOR INTERFERENCE CANCELLATION

CROSS-REFERENCE TO RELATED APPLICATIONS

This application claims the benefit of U.S. Provisional Application Ser. No. 63/287,787, filed on 9 Dec. 2021, U.S. Provisional Application Ser. No. 63/316,199, filed on 3 Mar. 2022, U.S. Provisional Application Ser. No. 63/362,289, filed on 31 Mar. 2022, and U.S. Provisional Application Ser. No. 63/403,658, filed on 2 Sep. 2022, each of which is incorporated in its entirety by this reference.

TECHNICAL FIELD

This invention relates generally to the communications field, and more specifically to a new and useful system and method for interference cancellation in the communications field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
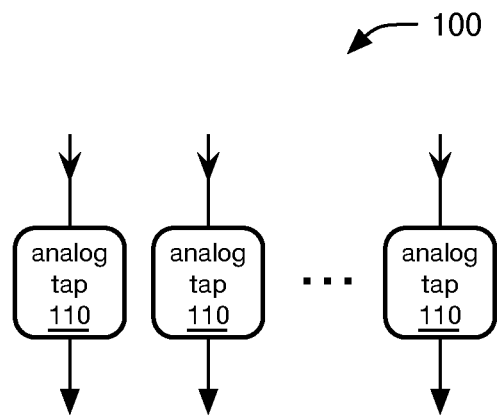
FIG. 1A is a schematic representation of an embodiment of a system for interference cancellation.
Figure 1B:
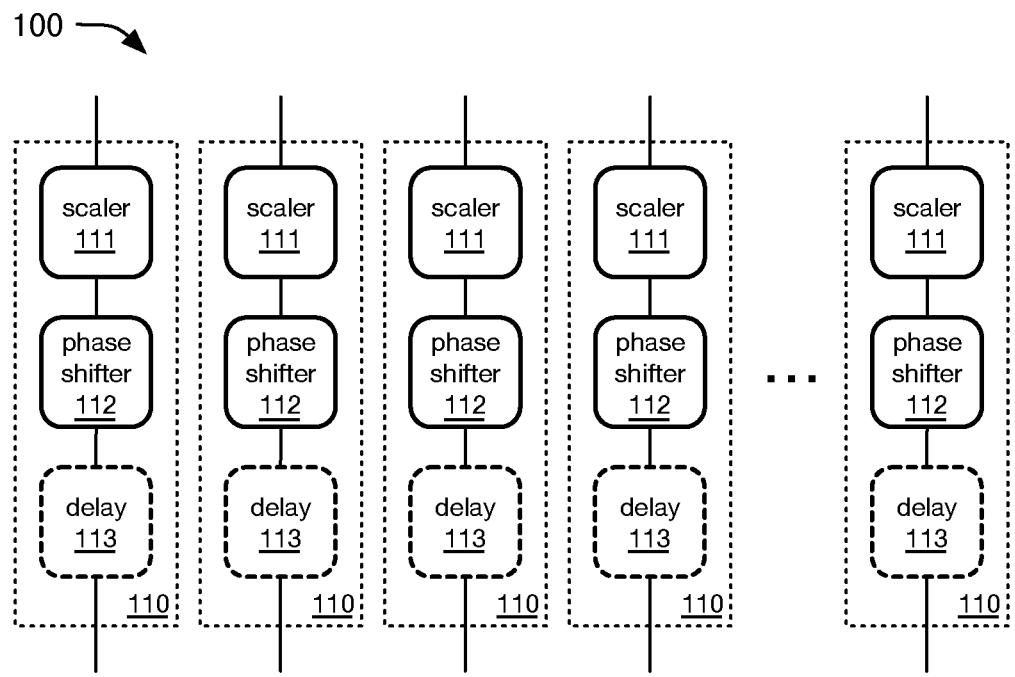
FIG. 1B is a schematic representation of an example of the system for interference cancellation.

A system 100 for interference cancellation preferably includes a plurality of analog taps 110 (e.g., as shown in FIGS. 1A-1B). Each analog tap 11o preferably includes one or more scalers in and/or phase shifters 112, and can optionally include one or more delays 113. The system 100 preferably functions to increase blocker isolation and/or adjacent-channel leakage (ACL) isolation (e.g., to reduce blocker channel and/or ACL channel intensities), and can additionally or alternatively function to increase beamforming gain (e.g., transmit and/or receive beamforming gain); however, the system 100 can additionally or alternatively have any other suitable functionality.

Figure 2A:
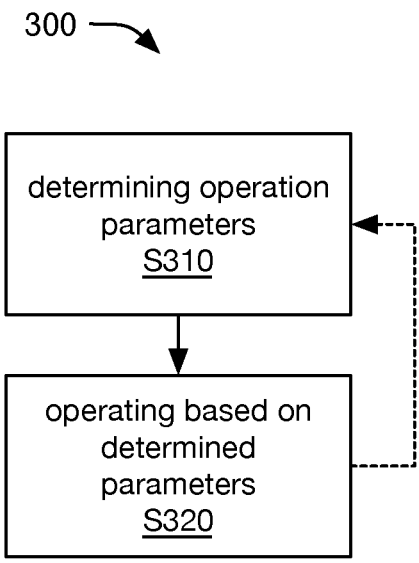
FIG. 2A is a schematic representation of an embodiment of a method for interference cancellation.

A method 300 for interference cancellation preferably includes determining operation parameters S310 and operating based on the determined parameters S320 (e.g., as shown in FIG. 2A). The method 300 is preferably performed using the system 100 (e.g., and/or an associated communication system 200), but can additionally or alternatively be performed using any other suitable system.

2. Benefits.

Variants of the technology can optionally confer one or more benefits. In implementing typical sub-band full duplex (SBFD) communication schemes, a MIMO communication system (e.g., a gNodeB (gNB), such as a 5G or 6G gNB) will typically operate a first subset of antennas in transmit mode concurrent with operating a second subset of antennas in receive mode, wherein transmit and receive are handled on nearby frequencies (e.g., wherein the associated frequency allocation may be dynamic and/or rapidly-changing). This can result in significant interference between transmit and receive channels which cannot typically be alleviated by the use of fixed filters. Some variants of the technology can enable effective and/or efficient isolation between the transmit and receive channels, in the face of these challenges. However, the benefits described below can additionally or alternatively be realized in any other suitable applications and/or under any other suitable constraints.

First, some variants of the technology can enable a large amount of isolation (e.g., 30-40 dB) while preserving greater beamforming flexibility (e.g., a larger number of beamforming degrees of freedom) for optimizing gain associated with communication with other systems (e.g., optimizing transmit array gain toward intended downlink user equipment, optimizing receive array gain from intended uplink user equipment, etc.). In typical systems that use beamforming for isolation (e.g., by using transmit beamforming to create a deep null at each receive antenna of an array), if high interference cancellation is required, little or no beamforming flexibility may remain for gain optimizations. For example, in a MIMO communication system with an equal number of transmit and receive antennas, no transmit beamforming degrees of freedom would typically remain after creating such nulls; or, if a practical degree of beamforming is dedicated to gain optimizations, then beamforming-based isolation may typically be limited to 15-20 dB or less. In contrast, some variants of the technology can exploit a combination of beamforming and interference cancellation to overcome such limitations.

Second, some variants of the technology can enable effective interference cancellation-based isolation for which complexity scales approximately linearly with the number of antennas in a MIMO system (e.g., rather than scaling approximately quadratically). Typical systems may require interference cancellation between each antenna and every other antenna of the system, leading to quadratic scaling of both cancellation hardware and control complexity. In contrast, some variants of the technology can rely on interference cancellation between each antenna and only a fixed number of other antennas (e.g., one other antenna, two other antennas, three other antennas, etc.), wherein the fixed number does not scale with the total number of antennas, thereby leading to only linear scaling of both hardware and control complexity.

Third, some variants of the technology can drastically increase the tractability of optimizing blocker and/or adjacent channel leakage (ACL) rejection. For example, optimization of ACL rejection is typically a difficult signal domain problem, dependent on non-linear functions of the transmit signal (e.g., arising from non-linear behavior of the transmit amplifiers). However, by modifying this optimization problem to remove signal-dependent considerations, some variants of the technology can enable performance of a symmetric (and possibly concurrent) channel-domain optimization of both ACL rejection and blocker rejection, simplifying the problem.

Fourth, some variants of the technology can enable fast (e.g., real-time, substantially real-time, and/or near-real-time), efficient, and/or inexpensive (e.g., requiring only inexpensive hardware) optimization of beamforming and/or interference cancellation control parameters. For example, by utilizing a staged and/or iterative optimization process, some variants of the technology can convert the optimization from a difficult non-linear problem to a sequence or cycle of simple linear problems.

However, one or more variants of the technology can additionally or alternatively confer any other suitable benefits.

3. Communication System.

The system 100 for interference cancellation is preferably associated with (e.g., connected to) a multiple-input multiple-output (MIMO) communication system 200, more preferably a massive MIMO (mMIMO) communication system. In some embodiments, the MIMO system 200 is and/or includes a radio transceiver of a wireless communication network, such as a 5G NR transceiver; in such embodiments, the MIMO system 200 is preferably (part or all of) a base station (e.g., gNB) of the network, but can alternatively be (part or all of) user equipment (UE) and/or any other suitable elements of the network. The MIMO system 200 is preferably configured (and/or operable) to communicate (e.g., with UEs of the network) using a sub-band full duplex (SBFD) communication scheme, but can additionally or alternatively be configured (and/or operable) in any other suitable manner.

Figure 3A:
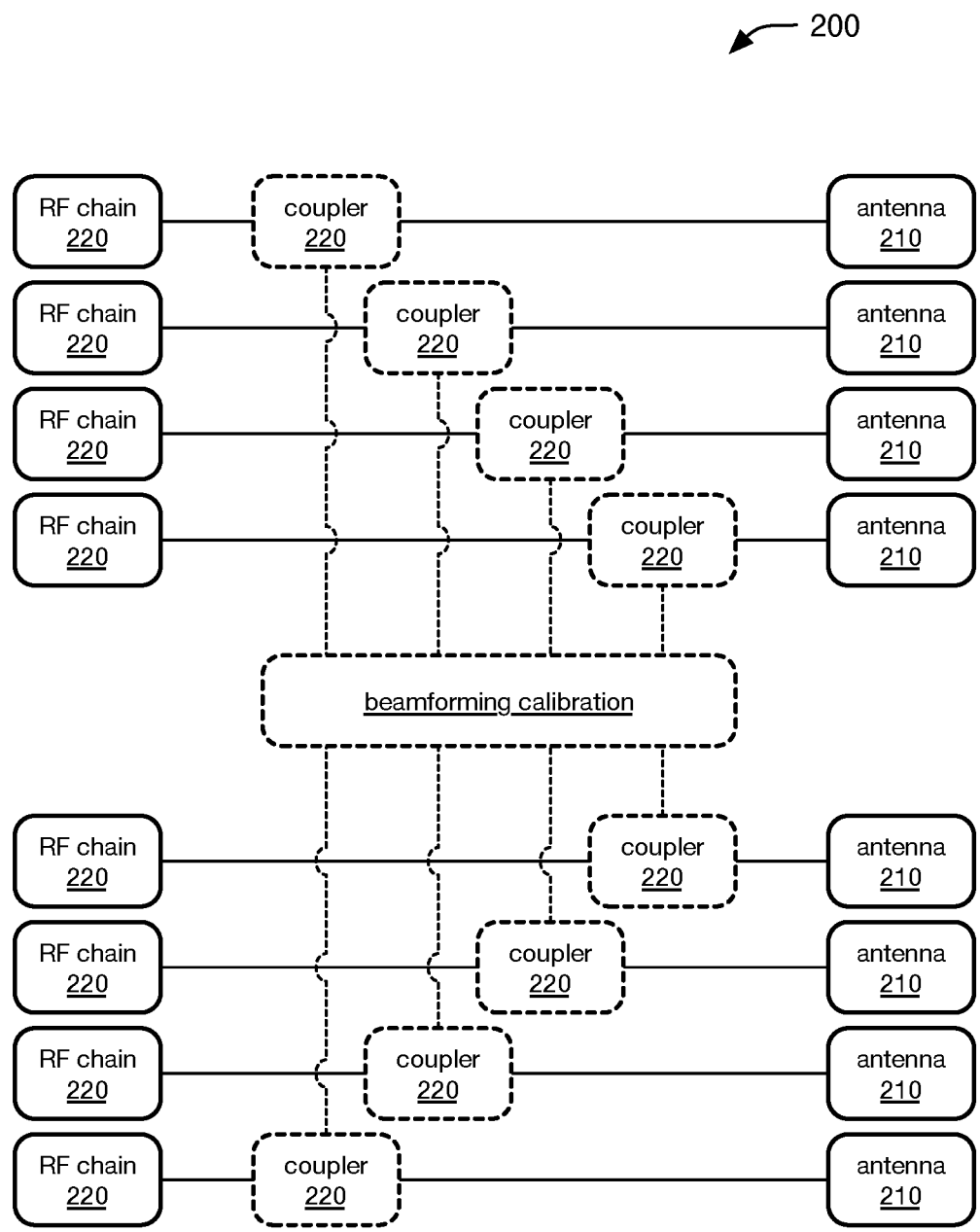
FIG. 3A is a schematic representation of a first embodiment of a MIMO communication system.
Figure 3B:
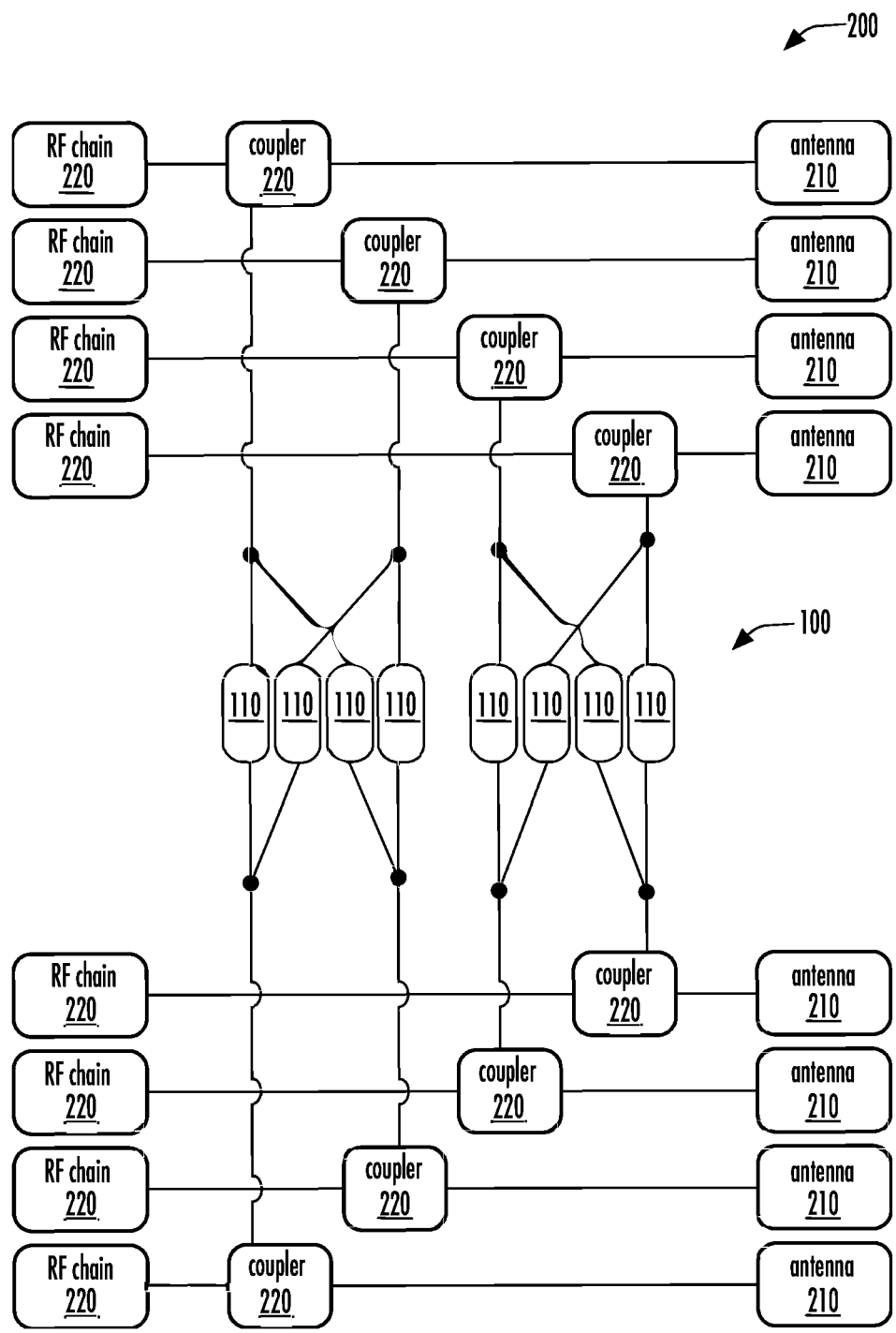
FIG. 3B is a schematic representation of a first embodiment of the system for interference cancellation integrated with the MIMO communication system.
Figure 3C:
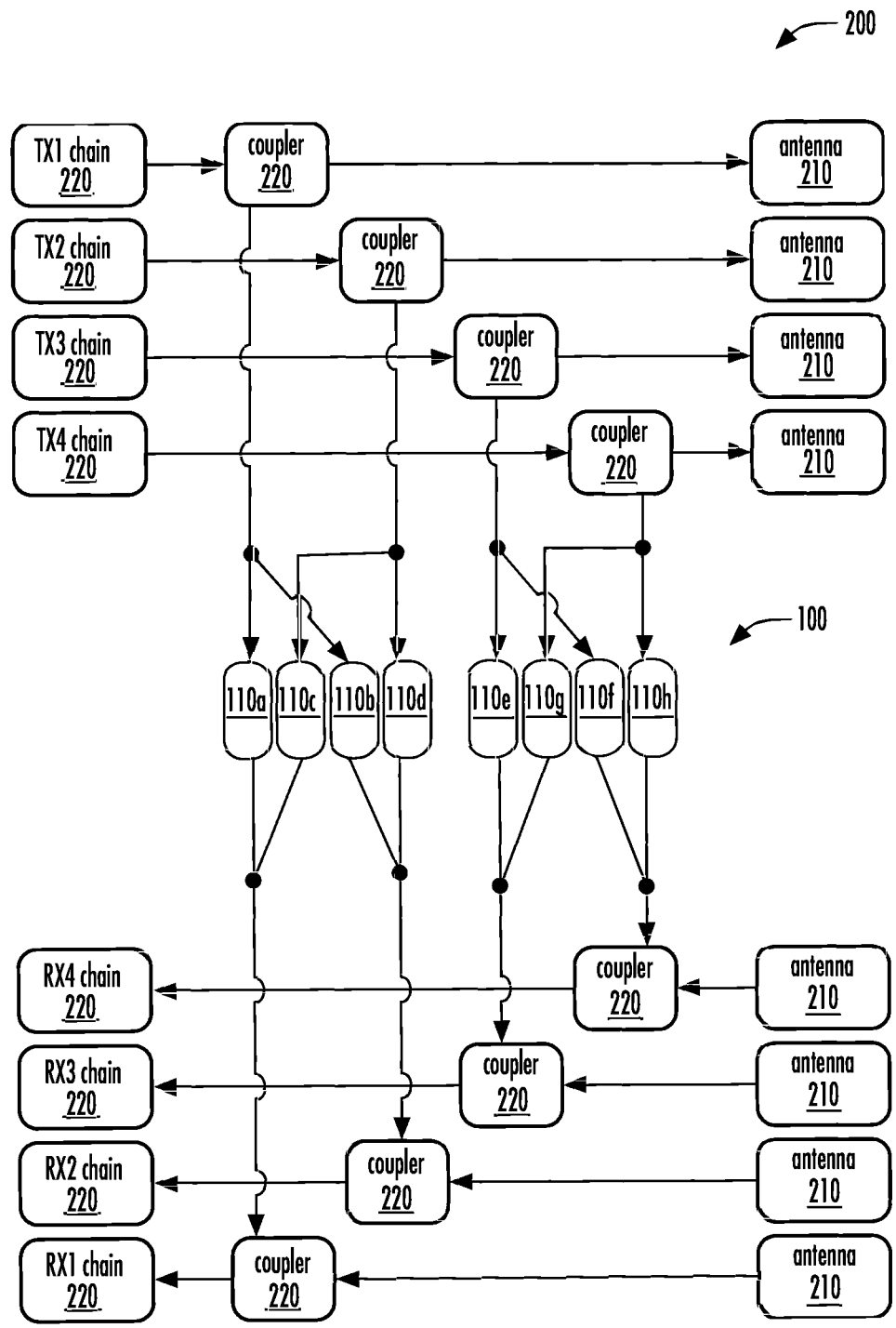
FIG. 3C is a schematic representation of a first example of the system for interference cancellation integrated with the MIMO communication system.
Figure 3D:
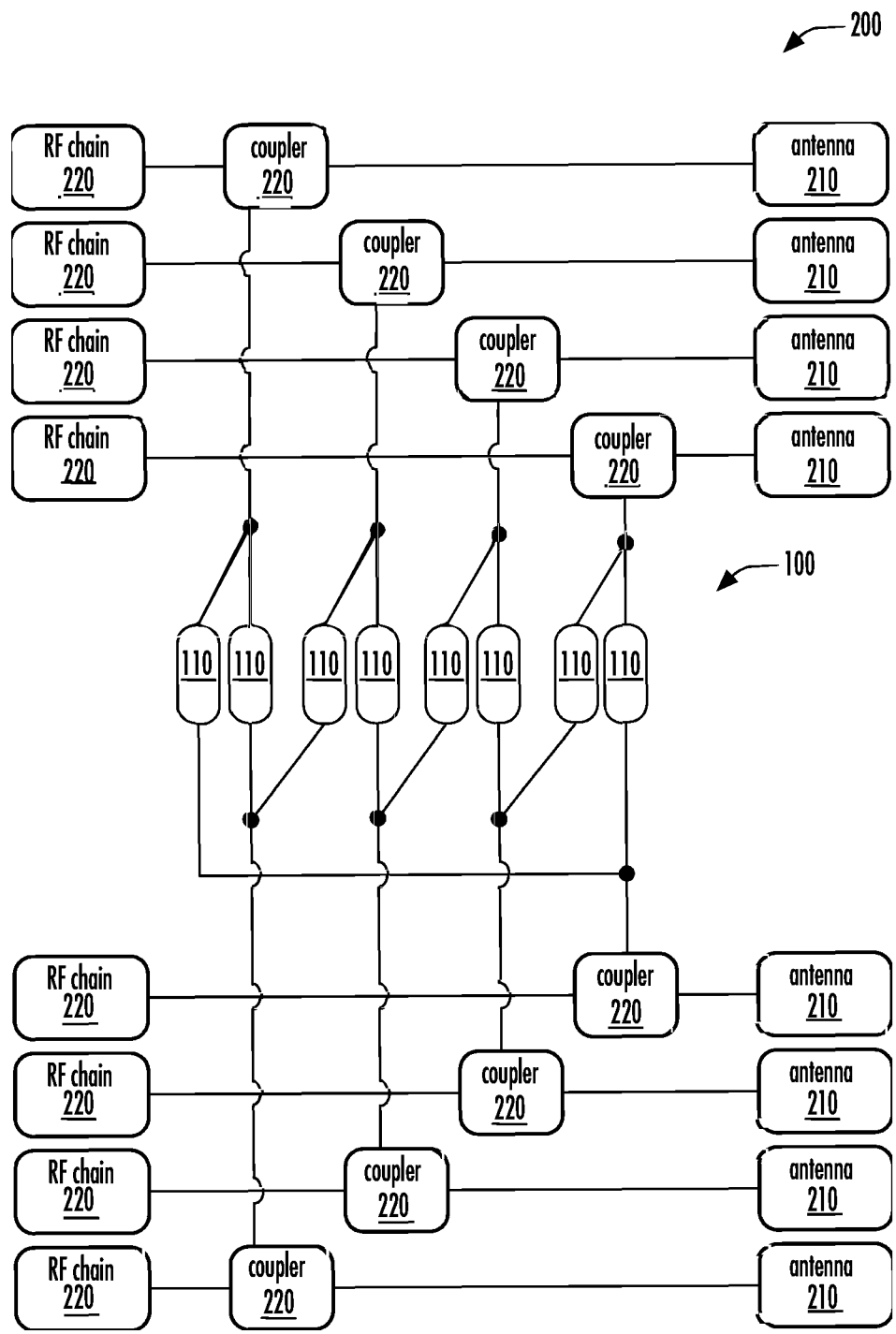
FIG. 3D is a schematic representation of a second embodiment of the system for interference cancellation integrated with the MIMO communication system.

The frontend of the MIMO system 200 preferably includes a plurality of antenna elements 210 (e.g., 32, 64, 128, 24-48, 48-96, 96-144, 144-256, and/or more than 256 antenna elements, etc.) and a plurality of RF chains 220, and can optionally include one or more antenna couplers 230 (e.g., as shown in FIGS. 3A-3B, 3D, and/or 5A-5B).

The RF chains 220 can include transmit chains, receive chains, transmit/receive chains, such as RF chains switchable between transmission and reception modes, and/or any other suitable RF chains. Each RF chain 220 is preferably connected to a different antenna element 210; alternatively, some or all antenna elements can be connected to multiple RF chains, such as wherein an antenna element is connected (e.g., via a circulator and/or duplexer) to one transmit chain and one receive chain (e.g., a first transmit chain and first receive chain connected to a first antenna element via a first circulator or duplexer, a second transmit chain and second receive chain connected to a second antenna element via a second circulator or duplexer, etc.). Each transmit chain (and/or transmit/receive chain) preferably includes a power amplifier (PA) 221. The PA preferably functions to amplify a transmit signal and provide the amplified transmit signal to an antenna element 210 (e.g., the antenna element to which the transmit chain is connected). Each receive chain (and/or transmit/receive chain) preferably includes a low-noise amplifier (LNA) 222. The LNA preferably functions to amplify a receive signal received from an antenna element 210 (e.g., the antenna element to which the receive chain is connected) and provide the amplified receive signal to a backend of the MIMO communication system 200. Each transmit/receive chain preferably includes a PA 221, an LNA 222, and a switch 223 configured to connect the antenna element to either the PA or the LNA (e.g., thereby switching the transmit/receive chain between the transmission mode and the reception mode).

The antenna couplers 230 (e.g., beamforming calibration couplers) are preferably each coupled to a different antenna element 210 of the MIMO system 200. In examples, the antenna couplers can function to enable calibration of beamforming parameters for the MIMO system 200.

The MIMO system 200 preferably defines a plurality of blocker channels and ACL channels, wherein each receive antenna is associated with a different blocker channel and each transmit antenna is associated with a different ACL channel. The blocker channel associated with a particular receive antenna can be defined as the combined effect, at the particular receive antenna, of transmissions within the transmit frequency range from all transmit antennas of the MIMO system. The ACL channel associated with a particular transmit antenna can be defined as the combined effect, at all receive antennas (e.g., following receive-side beamforming), of transmissions within the receive frequency range from the particular transmit antenna.

The MIMO system 200 is preferably operable tos perform beamforming and/or null-steering. However, the MIMO system 200 can additionally or alternatively have any other suitable functionality. Further, the MIMO system 200 can additionally or alternatively include any other suitable elements in any suitable arrangement. However, the system 100 can alternatively not be integrated and/or otherwise associated with a MIMO communication system, and/or can additionally or alternatively be integrated and/or associated with any other suitable systems.

4. System.

As described above, each analog tap 110 of the system 100 for interference cancellation preferably includes one or more scalers 111 and/or phase shifters 112, and can optionally include one or more delays 113 (e.g., as shown in FIG. 1B). A person of skill in the art will recognize that the scaler, phase shifter, and/or delay can be arranged in any suitable order within the analog tap (e.g., order relative to signal propagation through the analog tap); for example, the scaler can be arranged before the phase shifter (e.g., wherein the analog tap first scales and then phase shift signals propagating through the analog tap) or after the phase shifter (e.g., wherein the analog tap first phase shifts and then scales signals propagating through the analog tap).

The scaler in preferably functions to scale (e.g., attenuate and/or amplify) the amplitude of the signal propagating through the analog tap. The scaler is preferably operable to be configured between different scaling factors, such as operable to be controlled throughout a continuum of possible scale values (e.g., operable to scale the propagating signal by any factor between 1 and a minimum value, such as 0.1, 0.03, 0.01, etc.). However, the analog taps can additionally or alternatively include any other suitable scalers.

The phase shifter 112 preferably functions to shift the phase of the signal propagating through the analog tap. The phase shifter is preferably operable to be configured between different phase shift amounts, such as operable to be controlled throughout a continuum of possible phase shift values (e.g., operable to shift the phase of the propagating signal by any value between 0 and a maximum value, such as $\pi$, $\pi/2$, or $\pi/4$ radians, etc.). However, the analog taps can additionally or alternatively include any other suitable phase shifters.

If present, the delay 113 preferably functions to delay the signal propagating through the analog tap. The delay is preferably operable to be configured between different delay times, such as operable to be controlled throughout a continuum of possible delay values (e.g., operable to delay the propagating signal by any value between a minimum value, such as 0 or a value greater than zero, and a maximum value). Additionally or alternatively, the delay can be operable to impose a fixed delay, to switch between substantially zero delay and one or more fixed delay values, and/or be operable in any other suitable manner. However, the analog taps can additionally or alternatively include any other suitable delays.

As described above, some or all components of the analog taps (e.g., scalers 111, phase shifters 112, delays 113, etc.) are preferably configurable (e.g., operable to alter one or more operational characteristics, such as scaling factor, phase shift amount, delay time, etc.). Such configurability can be achieved by use of tunable elements (e.g., voltage-controlled elements, current-controlled elements, manually-tunable elements, etc.), by use of switched banks of separate elements (e.g., switched banks of non-tunable elements), and/or in any other suitable manner.

Figure 6A:
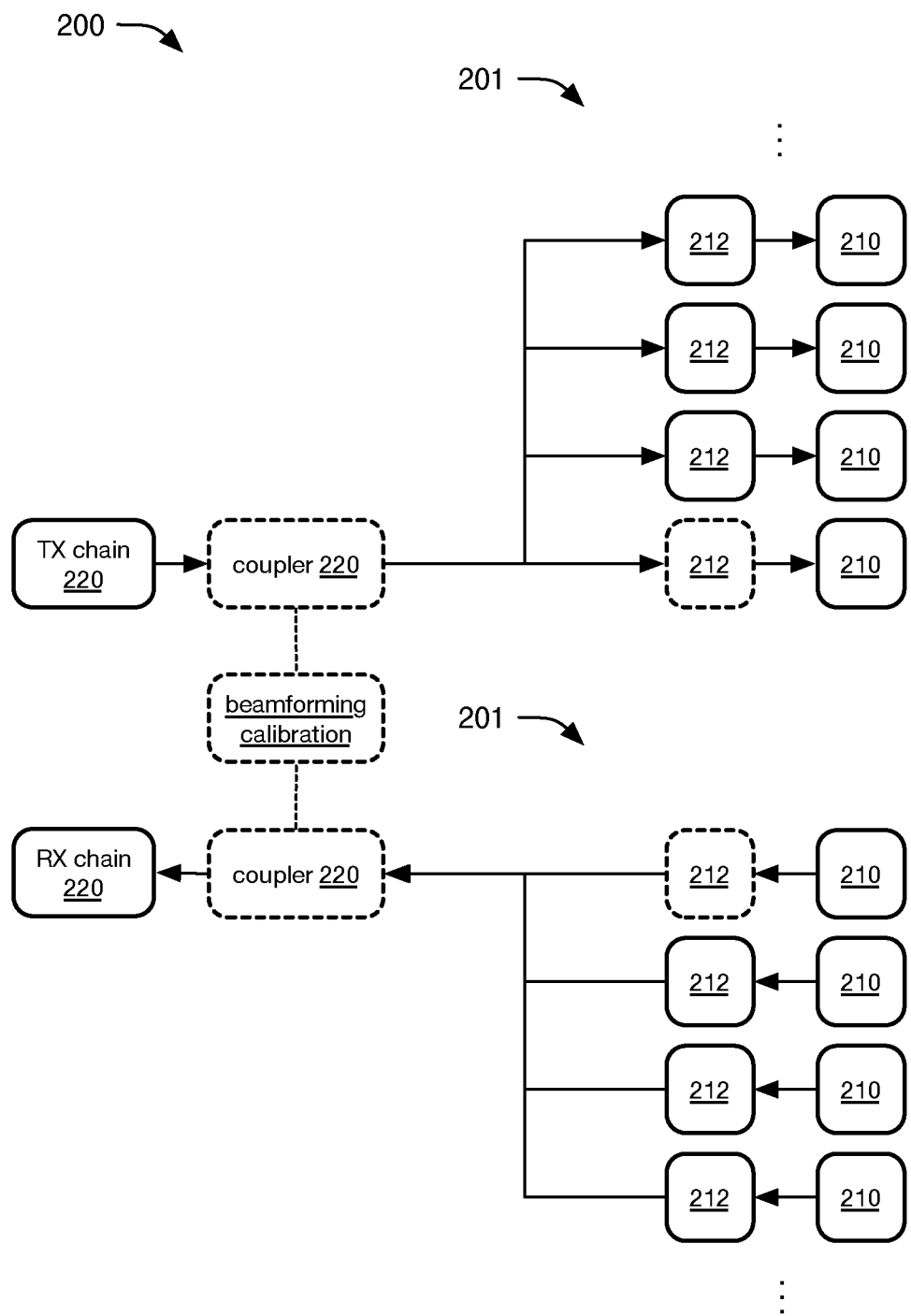
FIG. 6A is a schematic representation of a third embodiment of a MIMO communication system.
Figure 6B:
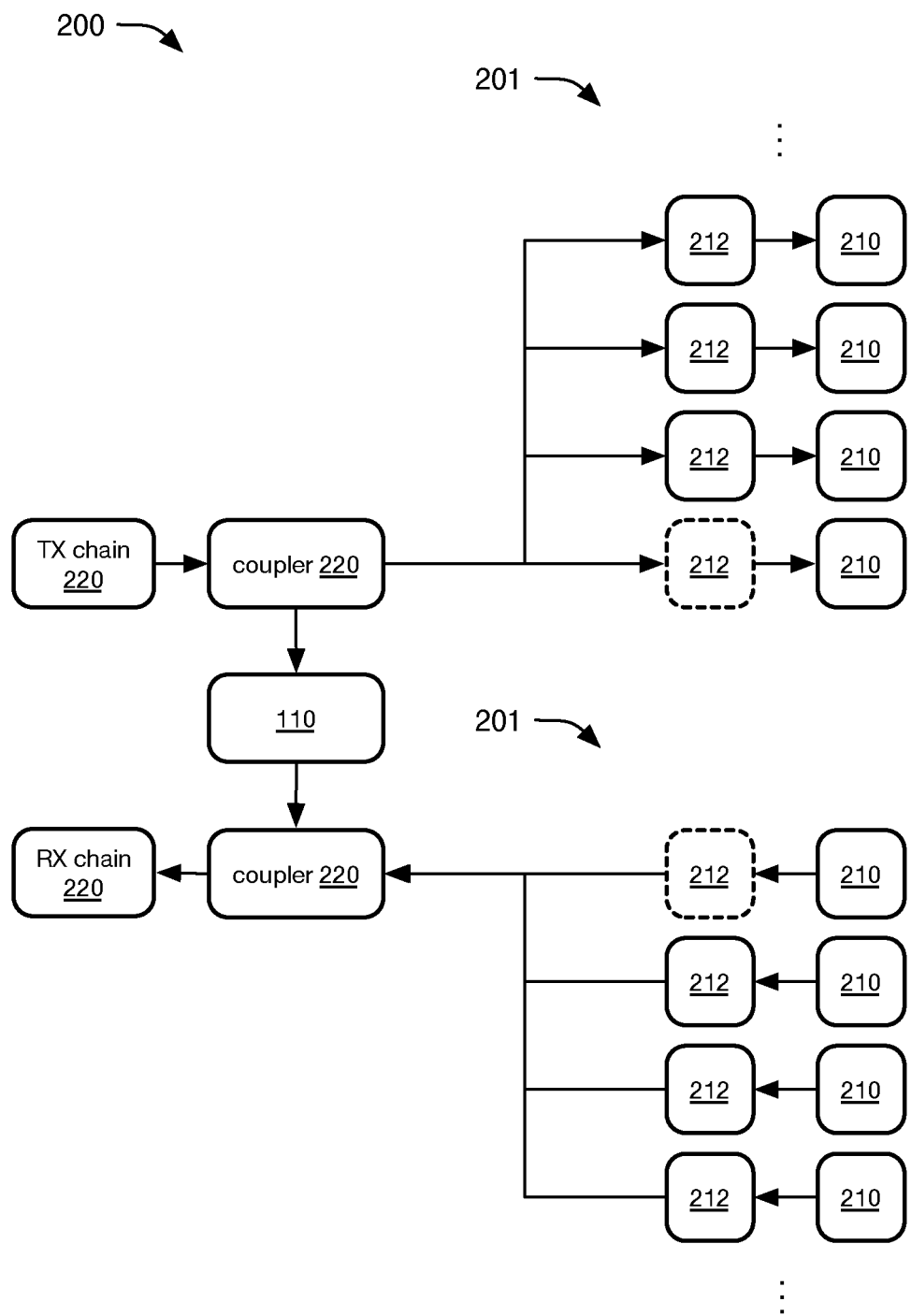
FIG. 6B is a schematic representation of a third embodiment of the system for interference cancellation integrated with the MIMO communication system.

Each analog tap 110 of the system 100 is preferably coupled to the MIMO system 200 (e.g., as shown in FIGS. 3B, 3D, and/or 5B). In particular, each analog tap 110 is preferably coupled between two antenna elements 210 (e.g., via the antenna couplers 230), more preferably coupled between a transmit antenna and a receive antenna. Alternatively, in examples in which the MIMO system includes one or more phased antenna arrays (e.g., in which the MIMO system is configured to perform analog and/or hybrid beamforming), each analog tap can be coupled between two phased antenna arrays (e.g., wherein, the tap preferably samples a transmit signal from the transmit chain upstream of the transmit array phase shifters and preferably injects a cancellation signal downstream of the receive array phase shifters; accordingly, one or more phase shifters are preferably arranged between the analog tap and some or all antennas of the phased array), such as shown by way of examples in FIGS. 6B and/or 7B-7C. Each analog tap preferably functions to sample a transmit signal from a transmit chain and/or to inject a cancellation signal into a receive chain. The tap samples a transmit signal downstream of the power amplifier (after transmit signal amplification), which can enable the sampling (and/or cancellation) of PA nonlinearities. On the receive side, the analog tap preferably injects the cancellation signal upstream of the LNA (before receive signal amplification), which can enable cancellation of blocker signals, thereby reducing the magnitude of blocker signals that reach the LNA (e.g., thus preventing these blocker signals from saturating the LNA). In examples in which multiple RF chains (e.g., one transmit chain and one receive chain) are connected to a single antenna element (e.g., via a circulator and/or duplexer), the analog taps can additionally or alternatively be connected between such RF chains connected to the same antenna element (e.g., connected across the circulator and/or duplexer, in a manner analogous to connection between two different antenna elements).

For a communication system 200 with a MIMO frontend including existing beamforming calibration couplers, these analog taps can share those couplers rather than using separate tap-specific couplers. Accordingly, in these examples, the system 100 can avoid increased insertion loss and/or sensitivity loss associated with the use of additional couplers in the frontend of the communication system 200.

The system 100 preferably includes at least as many analog taps 110 as there are antenna elements 210 of the MIMO communication system 200. More preferably, the system 100 preferably includes at least one analog tap 11o connected to each antenna element 210 (e.g., each transmit element and each receive element); a person of skill in the art will recognize that, as each analog tap is typically connected between a transmit element and a receive element, having at least as many analog taps as there are antenna elements will result in an average of two analog tap connections for each antenna element (e.g., if there are exactly as many analog taps as there are antenna elements and the tap connections are distributed evenly between the antenna elements, then each transmit element will be connected to two analog taps and thus connected via the analog taps to two different receive elements, and each receive element will be connected to two analog taps and thus connected via the analog taps to two different transmit elements. The system 100 can optionally include additional analog taps. For example, the system can include one or more additional analog taps, preferably wherein each of these taps includes a delay 113 (e.g., wherein the first set of taps may not include delays). These additional taps can be configured to perform multipath interference cancellation (e.g., wherein the delay elements thereof can be configured to account for longer delay times associated with the interference signal propagation time).

However, the system 100 preferably includes substantially fewer analog taps than the product of the number of transmit elements and the number of receive elements; that is, for a MIMO communication system 200 with M transmit elements and N receive elements, the number of analog taps in the system 100 is preferably substantially less than M*N (e.g., wherein 'substantially fewer' can indicate that the number of analog taps is less than 80%, 75%, 50%, 35%, 25%, 20%, 15%, or 10% of M*N, and/or that the number of analog taps is no more than or substantially no more than x $\sqrt{M*N}$ for x=2, 2.31, 2.5, 3, 4, 4.62, or 5, etc.). Such a limit can significantly reduce the hardware complexity of integrating all the analog taps with the MIMO communication system and/or reduce the control complexity of optimizing (or otherwise controlling) the operation parameters of each analog tap (e.g., wherein these reductions in complexity are as compared with a system including M*N analog taps, more than M*N analog taps, or insubstantially fewer than M*N analog taps).

In some such examples, the system 100 can include exactly M+N taps, exactly 2(M+N) taps, exactly 4(M+N) taps, between M+N and 2(M+N) taps, between 2(M+N) and 4(M+N) taps, or any other suitable number of taps. In a first example, in which M=N, a system may include M+N=2N=2√M*N taps or 2(M+N)=4√M*N taps. In a second example, in which M=3N, a system may include $$M + N = 4N = 4\sqrt{\frac{M*N}{3}} \approx 2.31\sqrt{M*N}$$

taps or 2(M+N)≈4.62√M*N taps. Additionally or alternatively, in some examples (e.g., in which the number of analog taps is substantially less than M*N), the number of analog taps may be no more than or substantially no more than x(M+N) for x=2, 3, 4, 5 or any other suitable value of x. However, the system 100 can additionally or alternatively include any other suitable number of analog taps.

In some examples, multiple logical taps of the system 100 can use a single antenna connection (e.g., with one or more couplers, such as splitters and/or summation elements as appropriate to enable such connections). In such examples, the numerosity and connectivity of the analog taps described above preferably applies to these logical taps (e.g., rather than to physical connections).

In a first example, the MIMO system 200 includes an equal number of transmit and receive elements (e.g., antennas). In a first specific example of the first example, the first transmit element (TX$_1$) and the second transmit element (TX$_2$) are each connected to the first receive element (RX$_1$) and the second receive element (RX$_2$), such as shown by way of example in FIG. 3C. In this specific example, the TX$_1$ coupler splits the sampled signal onto two taps (110a and 110b), each including a scaler 111 and phase shifter 112. Analogously, the TX$_2$ coupler splits its sampled signal onto taps 110c and 110d, each having its own scaler ill and phase shifter 112. Taps 110a and 110c are both coupled to RX$_1$ (e.g., wherein the RX$_1$ coupler sums the signals from the two taps and couples them to the antenna), and analogously, taps 110b and 110d are both coupled to RX$_2$ (e.g., wherein the RX$_2$ coupler sums the signals from the two taps and couples them to the antenna). Similarly, the third and fourth transmit elements (TX$_3$ and TX$_4$) are each connected to the third and fourth receive elements (RX$_3$ and RX$_4$) in an analogous manner, the fifth and sixth transmit elements (TX$_5$ and TX$_6$) are each connected to the fifth and sixth receive elements (RX$_5$ and RX$_6$) in an analogous manner, and so on.

Figure 3E:
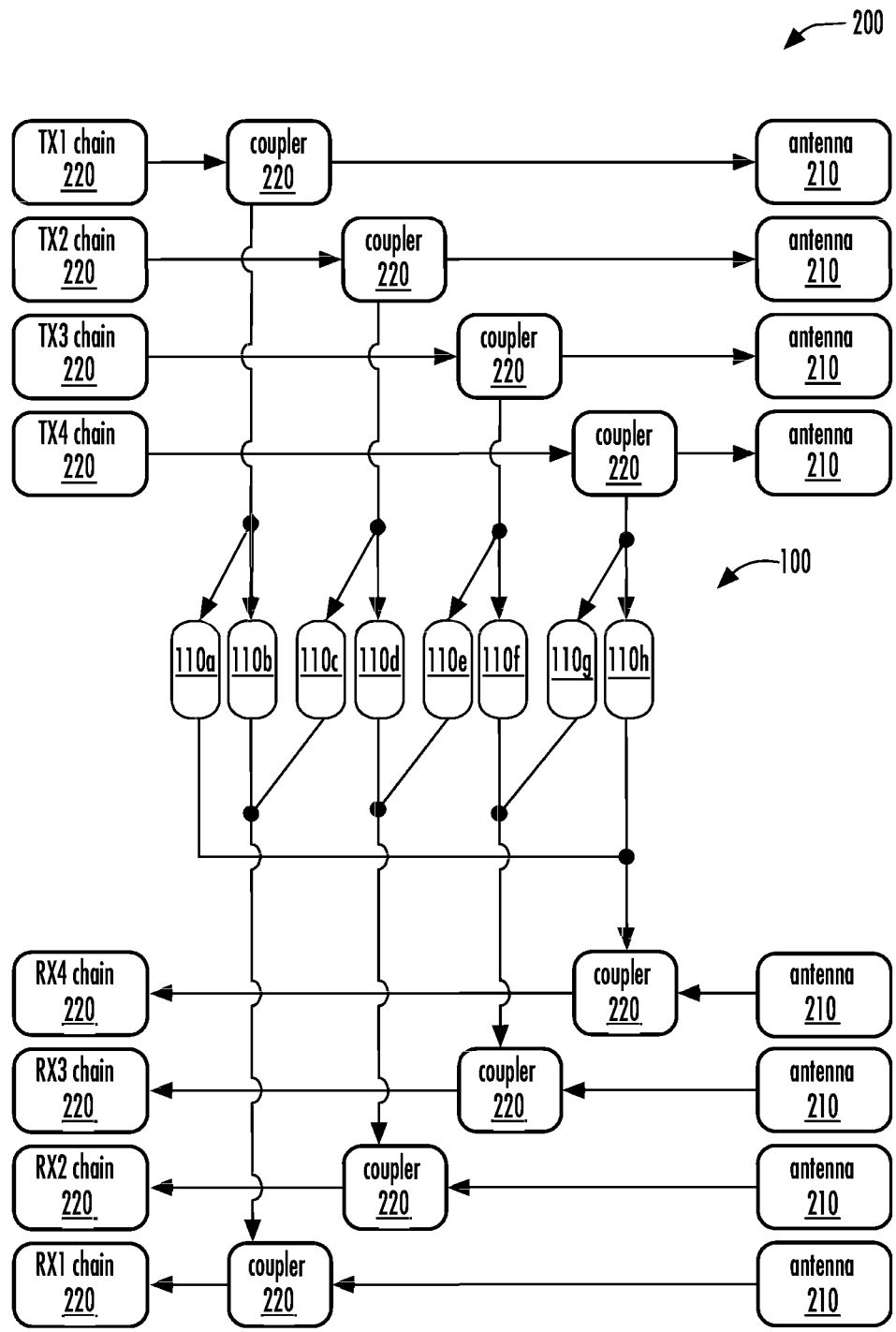
FIG. 3E is a schematic representation of a second example of the system for interference cancellation integrated with the MIMO communication system.

In a second specific example of the first example, every receive antenna RX$_i$ is connected to transmit antennas TX$_i$ & TX$_{i+1}$ (modulo N), such as shown by way of example in FIG. 3E. Accordingly, RX$_1$ is connected to TX$_1$ & TX$_2$; RX$_2$ is connected to TX$_2$ & TX$_3$, and so on (wherein the final receive element RX$_N$ is connected to TX$_1$ & TX$_N$). In this specific example, the TX$_1$ coupler splits the sampled signal onto two taps (110a and 110b), each including a scaler 111 and phase shifter 112. Analogously, the TX$_2$ coupler splits its sampled signal onto taps 110c and 110d, each having its own scaler 111 and phase shifter 112; the TX$_3$ coupler splits its sampled signal onto taps 110e and 110f, each having its own scaler nil and phase shifter 112, the TX$_4$ coupler splits its sampled signal onto taps 110g and 110h, each having its own scaler 111 and phase shifter 112; and so on. Taps 110b and 110c are both coupled to RX$_1$ (e.g., wherein the RX$_1$ coupler sums the signals from the two taps and couples them to the antenna); taps 110d and 110e are both coupled to RX$_2$ (e.g., wherein the RX$_2$ coupler sums the signals from the two taps and couples them to the antenna); taps 110f and 110g are both coupled to RX$_3$ (e.g., wherein the RX$_3$ coupler sums the signals from the two taps and couples them to the antenna); and so on in an analogous manner, typically with the exception of the highest-index receiver, wherein the first tap (111a) and the last tap are both coupled to this highest-index receiver (e.g., for a system in which RX$_4$ is the highest-index receiver, taps 110a and 110h are both coupled to RX$_4$,), preferably wherein the coupler for this highest-index receiver sums the signals from the two taps and couples them to the antenna.

Figure 4A:
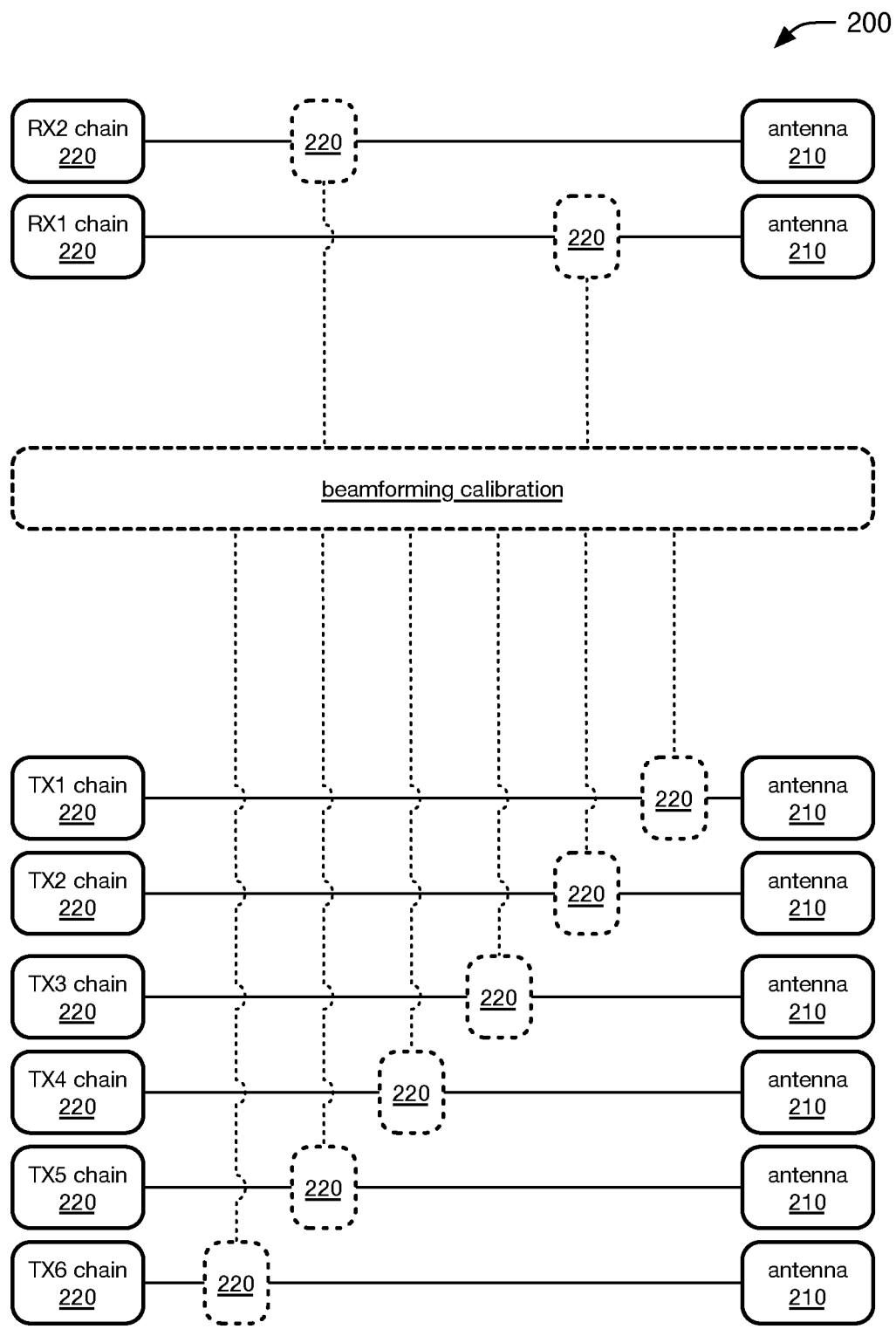
FIG. 4A is a schematic representation of a second embodiment of a MIMO communication system.
Figure 4B:
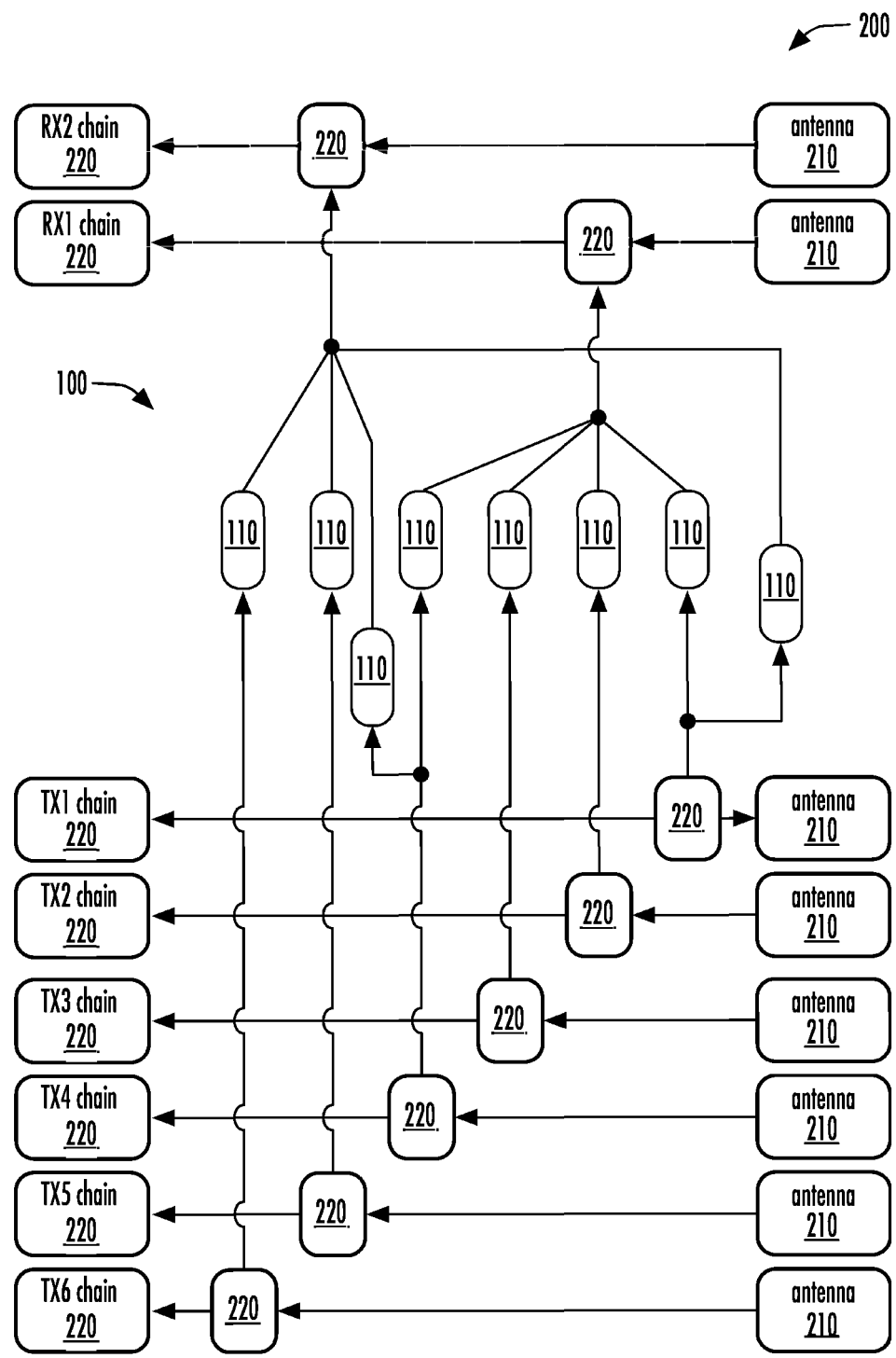
FIG. 4B is a schematic representation of a third example of the system for interference cancellation integrated with the MIMO communication system.
Figure 5A:
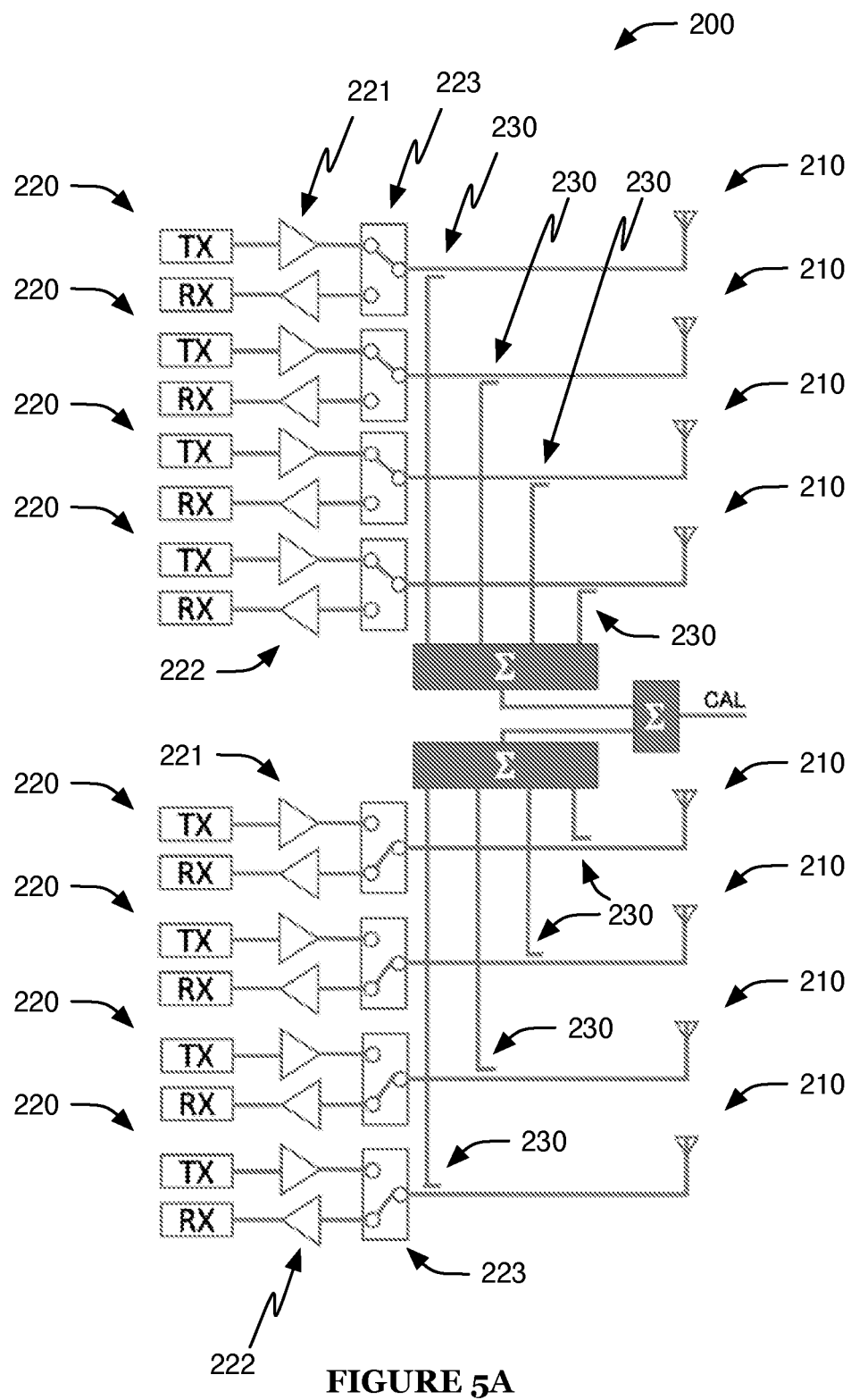
FIG. 5A is a schematic representation of an example of the MIMO communication system.
Figure 5B:
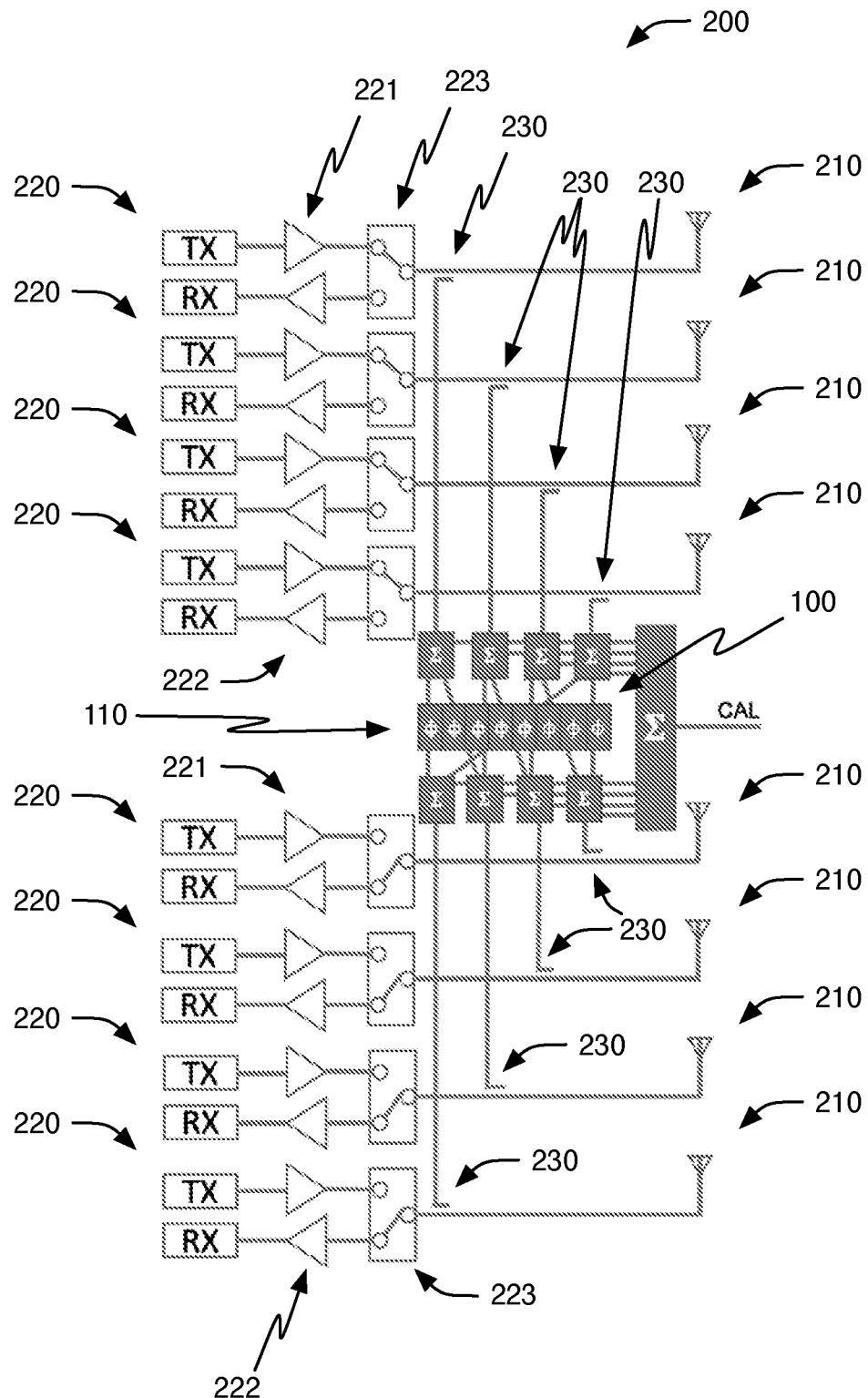
FIG. 5B is a schematic representation of a second example of the system for interference cancellation integrated with the MIMO communication system.

In a second example, the MIMO system 200 includes a 3:1 ratio of transmit to receive elements (wherein the MIMO system 200 includes three times as many transmit elements as receive elements), such as shown by way of example in FIG. 4A. In this example, each receive element is preferably connected (e.g., by a separate analog tap 110) to four different transmit elements. For example, such connectivity can be achieved by connecting every receive antenna RX$_i$ to transmit antennas TX$_{3i-2}$, TX$_{3i-1}$, TX$_{3i}$, and TX$_{3i+1}$ (modulo N), such as shown by way of example in FIG. 4B. Accordingly, RX$_1$ is connected to TX$_1$-TX$_4$, RX$_2$ is connected to TX$_4$-TX$_7$, and so on. In this example, the transmit antennas can either be coupled to a single analog tap or can be coupled to two analog taps (e.g., each connected to a different receive element). On the receive side, each receive element can be connected to four different analog taps (e.g., via a coupler that sums the cancellation signals from the four taps and couples them all to the antenna).

However, the system 100 can additionally or alternatively define any other suitable network of taps 110 connecting the antenna elements 210 of the MIMO system 200. Further, the system 100 can additionally or alternatively include any other suitable elements in any suitable arrangement.

Figure 7A:
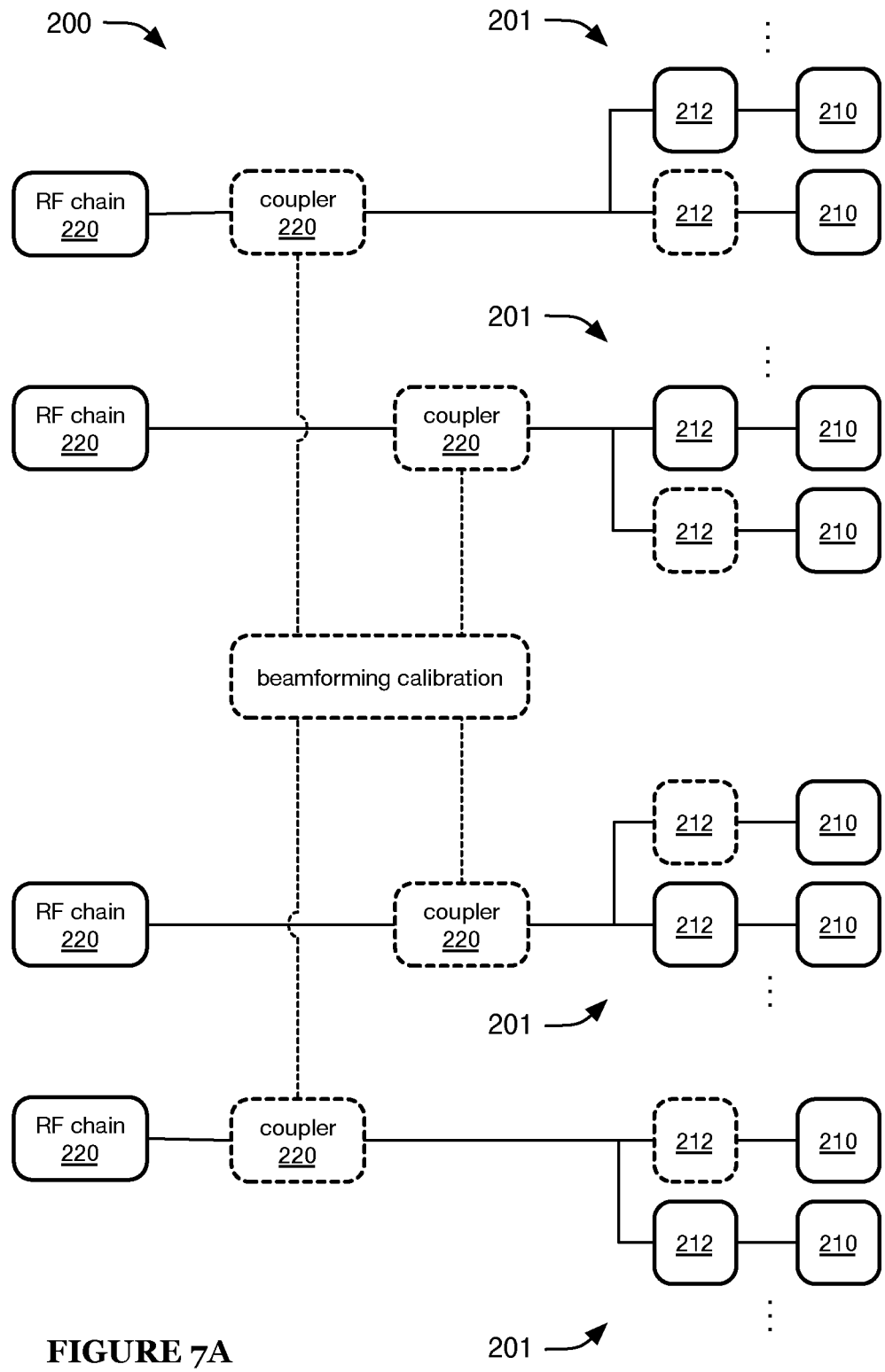
FIG. 7A is a schematic representation of a fourth embodiment of a MIMO communication system.
Figure 7B:
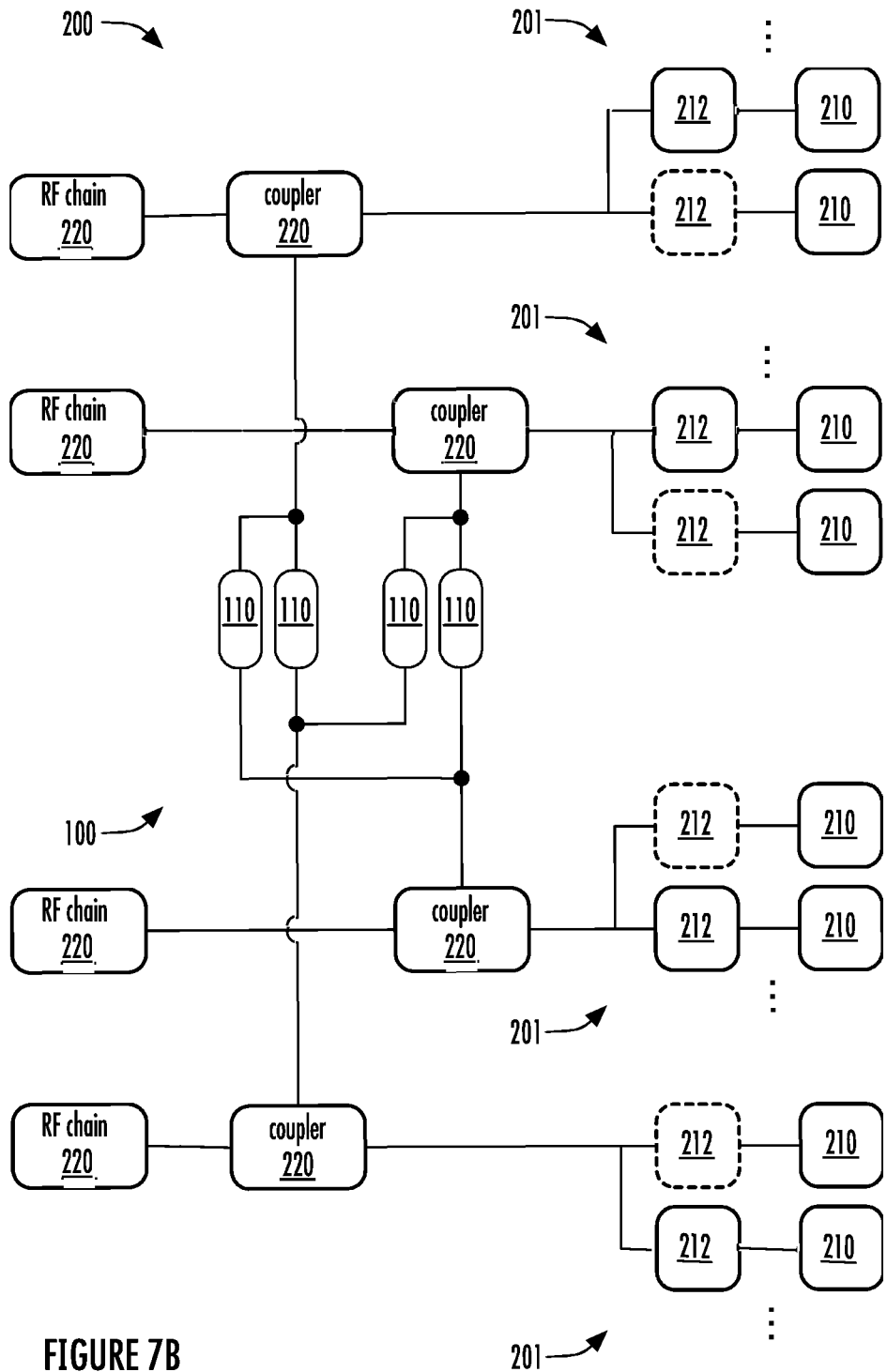
FIG. 7B is a schematic representation of a fourth embodiment of the system for interference cancellation integrated with the MIMO communication system.
Figure 7C:
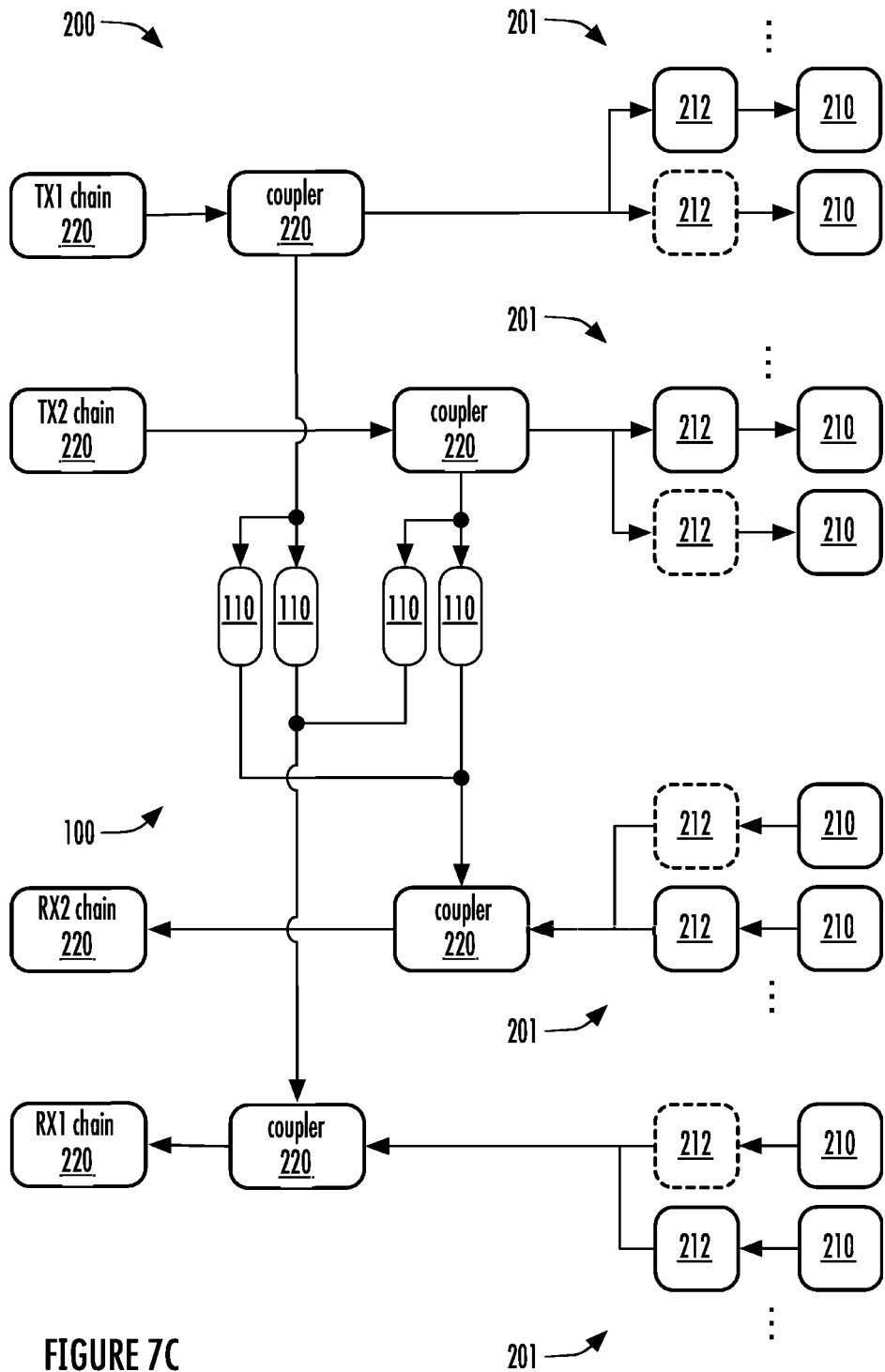
FIG. 7C is a schematic representation of a fourth example of the system for interference cancellation integrated with the MIMO communication system.

The system 100 (e.g., the analog taps 110 thereof) is described above regarding its connections to an mMIMO communication system 200 operable to perform digital beamforming. The system 100 can analogously be configured to operate with a communication system 200 operable to perform analog beamforming (e.g., wherein a single transmit chain feeds a phased array of transmit antennas and/or a single receive chain accepts signals from a phased array of receive antennas, such as shown by way of example in FIGS. 6A-6B) and/or hybrid beamforming (e.g., wherein each transmit chain feeds a separate phased array of transmit antennas and/or each receive chain feeds a separate phased array of receive antennas, such as shown by way of example in FIGS. 7A-7C), preferably including one or more phased arrays 201 of antennas, wherein each such phased array 201 includes a plurality of antennas 210 and phase shifters 212 operable to phase shift some antennas of the array relative to others. In examples in which multiple transmit elements share a PA (e.g., in communication systems using analog or hybrid transmit beamforming), fewer taps no may be utilized (e.g., one tap connected to each post-PA signal, such as before the amplified transmit signal is split to go to the multiple transmit elements). Analogously, in examples in which multiple receive elements share an LNA (e.g., in communication systems using analog or hybrid receive beamforming), fewer taps no may be utilized (e.g., one tap connected to each pre-LNA signal, such as after the signal from multiple receive elements has been combined). However, the system 100 can additionally or alternatively have any other suitable functionality and/or can be associated with (e.g., coupled to, configured to be coupled to, and/or operable to work in concert with) any other suitable MIMO communication system 200.

5. Method.

As described above, the method 300 for interference cancellation preferably includes determining operation parameters S310 and operating based on the determined parameters S320.

Determining operation parameters S310 preferably functions to determine parameters for effective beamforming and channel isolation. S310 more preferably functions to determine beamforming and RF cancellation parameters (e.g., wherein the RF cancellation parameters are preferably determined based on channel-domain considerations, rather than based on signal-domain considerations). In some embodiments, the parameters are determined in order to satisfy one or more of the following goals. First, to achieve high (e.g., to maximize) transmit gain to a downlink target (e.g., UE) or set of downlink targets. Second, to achieve high (e.g., to maximize) receive gain from one or more uplink targets (e.g., UEs). Third, to achieve sufficient (e.g., greater than or equal to 100 dB) blocker isolation for each receive element of the MIMO system (or for a subset thereof). Fourth, to achieve sufficient (e.g., greater than or equal to 100 dB) adjacent channel leakage (ACL) isolation from each transmit element of the MIMO system (or a subset thereof).

In a typical mMIMO system, system operation may include determining transmit and/or receive beamforming parameters, such as to maximize transmit and/or receive gains (e.g., analogous to the first and second goals above). Such optimization is typically performed independently for the transmit beamforming parameters and the receive beamforming parameters.

In contrast, S310 preferably includes performing optimization of beamforming and RF cancellation parameters together (e.g., of all such parameters or a subset thereof). This optimization preferably functions to satisfy all four of the goals described above (but can additionally or alternatively be performed to satisfy any subset thereof and/or any other suitable goals). Performing such optimization(s) can include simulating expected results associated with candidate parameter values (e.g., wherein objective functions are evaluated based on the simulated results), testing and/or measuring (e.g., in S320) actual performance of the system and/or the MIMO system when configured according to candidate parameter values (e.g., wherein objective functions are evaluated based on the measured results), and/or evaluating objective functions in any other suitable manner. Further detail regarding an example of such optimization is provided in the Appendix.

In a first embodiment, S310 includes joint optimization (e.g., in the channel domain, not in the signal domain) of all beamforming and RF cancellation parameters for all four goals. This joint optimization is typically a non-linear optimization problem and can be difficult to solve.

Accordingly, in a second embodiment, S310 can include the staged optimization (e.g., in the channel domain, not in the signal domain) of subsets of the parameters; in this embodiment, S310 preferably includes optimizing beamforming parameters S311 and/or optimizing RF cancellation channel parameters S312, but can additionally or alternatively include any other suitable optimizations. This staged optimization is preferably iterative, in which some or all stages are repeated (e.g., continuously, periodically, etc.; indefinitely, throughout operation of the system 100 and/or MIMO system 200, until one or more convergence criteria are reached, etc.); for example, S310 can include alternating (e.g., continuously) between performance of S311 and S312. For repeated iterations, optimizations preferably begin from the state determined during the previous iteration of the optimization (but can additionally or alternatively begin from a fixed initialization state and/or from any other suitable starting state). In some examples, the optimization problems in this embodiment can be much easier to solve as compared with joint optimization of all parameters.

In some variants of the second embodiment, the staged optimization process can optionally be followed by joint optimization of some or all of the parameters (e.g., using a local optimization approach, such as gradient descent; optimizing for some or all of the criteria described above, such as maximizing gain and/or ensuring that isolation exceeds a threshold value).

Optimizing beamforming parameters S311 preferably includes optimizing the transmit and receive beamforming coefficients (e.g., jointly optimizing all such coefficients or any suitable subset thereof), but can additionally or alternatively include optimizing any other beamforming parameters (e.g., phase shift values, such as for use in analog and/or hybrid beamforming and/or for use with any other suitable phased antenna arrays) and/or any other suitable parameters of any kind. The beamforming parameters are preferably optimized based on one or more objectives associated with transmit and receive gain for target UEs (e.g., corresponding to the first and second goals described above); for example, the transmit beamforming coefficients can be optimized based on transmit gain for one or more target downlink UEs and/or the receive beamforming coefficients can be optimized based on receive gain for one or more target uplink UEs. The beamforming parameters can additionally or alternatively be optimized based on one or more objectives associated with isolation, such as blocker and/or ACL isolation (e.g., as described above regarding the third and fourth goals); for example, transmit beamforming parameters can additionally or alternatively be optimized based on blocker channel isolation for each receive element (or a subset thereof), and/or receive beamforming parameters can additionally or alternatively be optimized based on ACL isolation for each receive element (or a subset thereof). In examples in which one or more optimization objectives including isolation aspects are used in S311, it may be desirable to ensure that beamforming optimization prioritizes gain performance over isolation performance (e.g., as the RF cancellation channel parameters can also be used to increase isolation performance, but typically cannot be used to increase gain performance).

In some examples, the optimization can be performed based on a single objective function that depends on both the gain performance and the isolation performance. In some such examples, the extent to which these different aspects affect the objective function can be adjustable (e.g., dynamically adjustable), such as wherein one or more such aspects is associated with a weight parameter (e.g., wherein the weight parameter can be altered for different iterations of S311). For example, it may be desirable to perform initial iterations of S311 using a low weight or zero weight for isolation performance (e.g., thereby ensuring that adequate beamforming gain can be achieved), and then perform later iterations of S311 using a higher weight for isolation performance (e.g., gradually increasing the isolation performance weighting from the initial value to a final desired value).

Additionally or alternatively, the optimization can be constrained based on observed and/or expected performance (e.g., beamforming gain performance). For example, one or more historical or expected gain performance values (e.g., best achievable gain, typically-achievable gain, etc.) can be stored, one or more threshold values can be determined based on the stored values (e.g., 1 dB worse than the best performance, equal to the typically-achievable performance, etc.), and future iterations of the optimization can be constrained such that the gain performance (e.g., transmit and/or receive gain performance) is not allowed to be worse than the threshold value(s). In a specific example, early iterations of S311 are performed to optimize primarily for beamforming gain performance (e.g., with little or no weight given to isolation performance in a combined objective function), and later iterations of S311 may be performed with increased emphasis on isolation performance (e.g., increasing the weighting of the isolation performance in a combined objective function), while ensuring that beamforming performance remains adequate by constraining the optimization such that the beamforming performance may not be less than the threshold value(s).

However, S311 can additionally or alternatively include optimizing the beamforming parameters (and/or any other suitable parameters) in any other suitable manner.

Optimizing RF cancellation channel parameters S312 preferably includes optimizing one or more parameters (e.g., amplitude, phase, and/or delay) for each analog tap (or a subset thereof), but can additionally or alternatively include optimizing any other cancellation parameters and/or any other suitable parameters of any kind. The RF cancellation channel parameters are preferably optimized based on one or more objectives associated with blocker isolation and ACL isolation (e.g., corresponding to the third and fourth goals described above).

For system and/or MIMO system operation, it is typically preferable to have very poor isolation for a small subset of antennas (e.g., wherein these antennas can be deactivated in response to the very poor isolation) and good isolation (e.g., exceeding a threshold value, such as 100 dB) for the remaining antennas, rather than to have moderately degraded isolation for all antennas or for a larger subset of antennas; additionally or alternatively, it is typically preferable to have isolation above a threshold value (e.g., threshold corresponding to good isolation, such as 100 dB) for all antennas, rather than to have isolation well above the threshold value for a first subset of antennas and isolation below the threshold value for a second subset of antennas. Accordingly, the objective preferably includes a non-linear cost function associated with the isolation performance, such as wherein the cost is not affected or only minimally affected by changes in isolation values above the threshold (e.g., zero slope or low slope above the threshold), and/or wherein the cost is not affected or only minimally affected by changes in isolation values well below the threshold (e.g., below a low performance threshold associated with antenna deactivation). For example, S312 can include attempting to reach the threshold isolation value (e.g., greater than or equal to 100 dB) for each blocker channel and ACL channel (or for a subset thereof, such as deactivating one or more receive elements in response to insufficient isolation, and subsequently excluding from the optimization any blocker and ACL channels associated with those receive elements; such excluded channels would preferably also be excluded from optimizations performed in subsequent iterations of S311). However, S310 can additionally or alternatively include performing optimizations based on any other suitable objective functions.

In some examples, performance of S312 (e.g., performance of a first iteration of S312, such as initial performance during or following system 'boot-up') can begin from a 'zero' state (e.g., wherein all cancellation parameters are initially set to zero), whereas in other examples, performance of S312 can begin from a pre-calibrated state, preferably wherein all cancellation parameters (or a subset thereof) are initially set according to predetermined values, such as values determined based on a calibration of the system (e.g., calibration performed during and/or after integration of the system 100 with the MIMO system 200); however, S312 can additionally or alternatively be performed using any other suitable starting state.

Figure 2B:
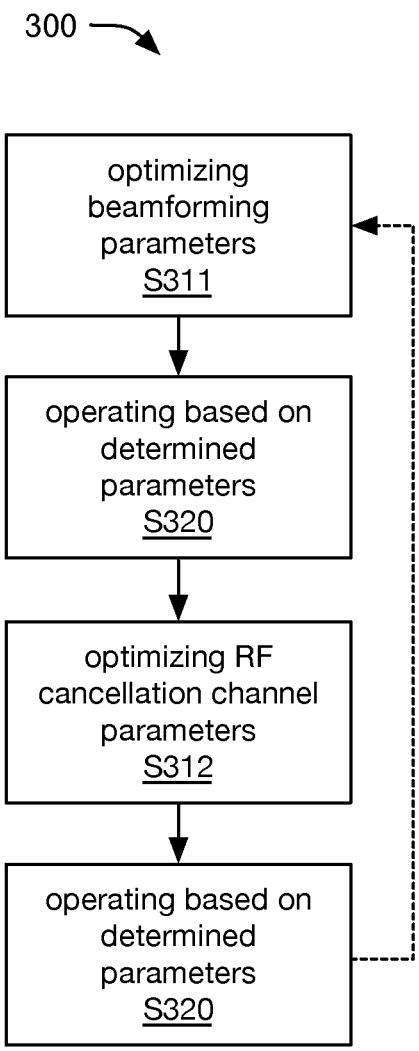
FIG. 2B is a schematic representation of an example of the method.
Figure 2C:
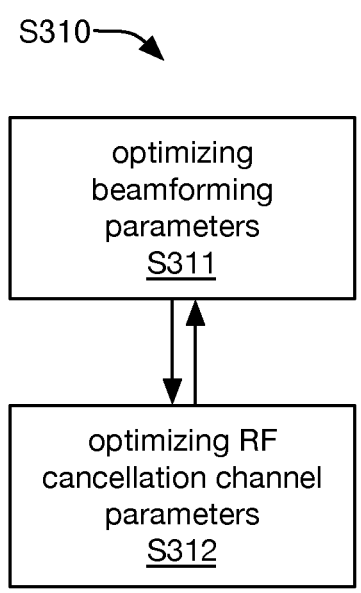
FIG. 2C is a schematic representation of an embodiment of an element of the method.

In one example of the second embodiment, S310 includes iteratively repeating S311 and S312 (e.g., alternating between S311 and S312, such as shown by way of examples in FIGS. 2B-2C). In this example, performance of S311 is preferably constrained such that beamforming gain is not significantly reduced (e.g., reduced by more than a threshold amount, such as 0.2, 0.5, 1, 2, 3, or 5 dB, etc.); however, S311 can additionally or alternatively be constrained in any other suitable manner, and/or can be performed without any such constraints. In a specific example, S310 includes first performing S311 based primarily or entirely on one or more gain objectives (e.g., wherein the impacts of beamforming on isolation are ignored or considered only as a secondary factor), then performing S312 to improve blocker and/or ACL isolation (e.g., improve to a threshold level of performance for each channel, such as the final threshold or a lower 'boot-up' threshold), and then repeating to iterate between S311 and S312, preferably altering (e.g., gradually altering such as altering by a small amount for each of a plurality of iterations, altering in one or more large steps, etc.) one or more configuration parameters associated with one or both of S311 and S312 (e.g., for S311, the weight of isolation performance in the optimization objective(s); for S312, the threshold isolation performance; for one or both, a set of isolation channels excluded from optimization, such as channels associated with receive elements for which sufficient isolation cannot or has not been achieved without significant negative impacts on beamforming gain; etc.). In this specific example, S310 can include continuing to iterate between S311 and S312 (e.g., indefinitely, until satisfaction of one or more convergence criteria, etc.) after these configuration parameter alterations, and/or can additionally or alternatively include making any other suitable configuration parameter alterations and/or operating in any other suitable manner. Alternatively, S310 can include performing S312 first (e.g., before a first performance of S311), then performing S311, and then continuing to alternate between the two (e.g., for any suitable period of time, number of iterations, and/or other threshold).

In some examples, S310 (e.g., S311 and/or S312) can include caching one or more parameter values (e.g., optimized parameter values determined in performance of S310, such as in performance of S311 and/or S312) and/or retrieving one or more previously-cached parameter values (e.g., wherein the retrieved values can be used as a starting point for optimization and/or can be used without further optimization). For example, when S310 is performed for a particular set of uplink and downlink sub-band assignments, the some or all optimized parameter values associated with that set of sub-band assignments can be cached (e.g., caching the beamforming parameter values determined in S311, caching the analog tap configuration parameter values determined in S312, etc.); during future performance of S310 (e.g., during a future communication slot) in which similar or identical sub-band assignments are used, some or all of these cached values can be retrieved and used (e.g., as a starting point for further optimization, in place of further optimization, etc.).

S310 is preferably performed continuously or periodically (e.g., substantially continuously), but can additionally or alternatively be performed sporadically, in response to trigger events (e.g., in response to detection of changed conditions, such as new target UEs, significant degradations or other changes in gain and/or isolation performance, etc.; in response to receipt of a re-optimization request, such as from one or more UEs, from a network control entity, etc.; in response to any other suitable triggers), be performed only once, and/or be performed with any other suitable timing. However, S310 can additionally or alternatively include determining beamforming and/or RF cancellation parameters in any other suitable manner.

Operating based on the determined parameters S320 preferably functions to enable performant, low-interference operation of a MIMO (e.g., mMIMO) communications system. S320 is preferably performed based on the operation parameters determined in S310, but can additionally or alternatively be performed based on any other suitable information. S320 is preferably performed in response to performance of S310 (e.g., upon completion of S310, concurrent with performance of S310, such as proceeding upon determination of the relevant operation parameters, etc.), but can additionally or alternatively be performed with any other suitable timing.

S320 preferably includes configuring system elements based on the operation parameters (e.g., determined in S310). The system elements configured in S320 can include one or more: analog taps (and/or elements thereof, such as scalers, phase shifters, delays, etc.) of a system for interference cancellation, such as the system 100 described above; beamforming control elements (e.g., phase shifters, digital beamforming elements, etc.) of a MIMO communications system, such as the MIMO system 200 described above; and/or any other suitable system elements. For example, S320 can include configuring one or more analog taps based on the cancellation channel parameters (e.g., phase, gain, and/or delay for each channel) determined in S310 and/or can include configuring one or more beamforming control elements based on the beamforming parameters (e.g., transmit and/or receive beamforming coefficients) determined in S310 (and/or determined based on a subset of S310, such as performance of S311 and/or S312. For example, beamforming parameters used in S320 can be updated in response to performance of S311, and/or RF cancellation channel parameters used in S320 can be updated in response to performance of S312; preferably, the next iteration of S312 is performed after the beamforming parameters used in S320 are updated based on the most recent iteration of S311, and/or the next iteration of S311 is performed after the RF cancellation channel parameters used in S320 are updated based on the most recent iteration of S312. However, S320 can additionally or alternatively include configuring any suitable elements in any suitable manner.

S320 preferably further includes (e.g., while the system elements are configured based on the operation parameters) operating the MIMO communications system to transmit and/or receive signals (e.g., to and/or from one or more target UEs).

However, S320 can additionally or alternatively include operating the MIMO communications system in any other suitable manner.

The method 300 can optionally include repeating one or more of the elements described above. For example, the method can include repeating S310 to determine updated operation parameters (e.g., based on changes in the system, the surroundings, and/or the desired operation mode, such as a change in position of one or more target UEs and/or other UEs, switching which UEs are targets for transmission and/or reception, etc.), and then performing S320 based on the updated operation parameters. The method (e.g., S310 and/or S320, any other suitable elements of the method, etc.) is preferably performed continuously, substantially continuously, and/or periodically (e.g., throughout a time period, such as throughout operation of the MIMO system and/or throughout any suitable subset thereof). For example, S310 can be performed starting at or near a 'boot-up' event associated with the MIMO system 200 and/or the system 100, and/or continuing throughout operation (e.g., normal operation) of the MIMO system 200 and/or the system 100 (e.g., until a 'shut-down' event and/or a switch to a different operation mode, etc.), wherein S320 is preferably performed in response to performance of S310 (e.g., wherein S320 is performed based on each updated set of operation parameters determined by performance of S310, or determined based on a subset of S310, such as performance of S311 and/or S312).

In some examples, S310 and/or S320 are performed (e.g., performed once, performed repeatedly, etc.) while communication assignments between the MIMO communication system and one or more UEs remain unchanged (e.g., within a communication slot). Such communication assignments can include, in examples, one or more UEs targeted for downlink (e.g., wherein the MIMO communication system transmits to the targeted UE(s)), one or more sub-bands for downlink communications, one or more UEs targeted for uplink (e.g., wherein the targeted UE(s) transmit to the MIMO communication system), and/or one or more sub-bands for uplink communications; however, such communication assignments can additionally or alternatively include any other suitable parameters. In some such examples, in response to a change in one or more communication assignments (e.g., in response to one slot elapsing and a new slot beginning), S310 and/or S320 may be performed again (e.g., performed once, performed repeatedly, etc.), preferably functioning to optimize MIMO communication system operation for the new communication assignments.

However, the method can additionally or alternatively include performing one or more elements described above with any other suitable timing, and/or can include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method of interference cancellation for a multiple-input multiple-output (MIMO) communication system having a plurality of transmit elements and a plurality of receive elements, the method comprising, while the MIMO communication system targets a first set of user equipment (UE) for downlink communications and targets a second set of UE for uplink communications:
   at an interference cancellation system comprising a plurality of analog taps, each analog tap of the plurality connected between a respective transmit element of the MIMO communication system and a respective receive element of the MIMO communication system, wherein each analog tap of the plurality is configurable:
      determining a first set of analog tap configurations by performing a first optimum search, based on a first cancellation objective function associated with a set of self-interference channels defined by the MIMO communication system, over an analog tap configuration parameter space associated with the plurality of analog taps; and
      in response to determining the first set of analog tap configurations, configuring the plurality of analog taps based on the first set of analog tap configurations;
   while the plurality of analog taps is configured based on the first set of analog tap configurations, determining a first beamforming configuration by performing a second optimum search, based on a first beamforming objective function, over a beamforming parameter space, wherein the first beamforming objective function is associated with:
   the set of self-interference channels;
   a transmit gain for transmissions from the MIMO communication system to the first set of UE; and
   a receive gain for transmissions from the second set of UE to the MIMO communication system; and
   in response to determining the first beamforming configuration, providing information indicative of the first beamforming configuration to the MIMO communication system;
   wherein each receive element of the plurality is associated with a respective blocker channel of the set of self-interference channels, wherein each transmit element of the plurality is associated with a respective adjacent-channel leakage (ACL) channel of the set of self-interference channels.

2. The method of claim 1, wherein determining the first set of analog tap configurations and determining the first beamforming configuration are performed during a first time interval, wherein the MIMO communication system transmits to the first set of UE and receives transmissions from the second set of UE substantially continuously throughout the first time interval.

3. The method of claim 1, further comprising, while the MIMO communication system targets the first set of UE for downlink communications and targets the second set of UE for uplink communications, before determining the first set of analog tap configurations:
   determining an initial beamforming configuration by performing an initial optimum search, based on an initial beamforming objective function associated with the transmit gain and the receive gain, over the beamforming parameter space; and
   in response to determining the initial beamforming configuration, providing information indicative of the initial beamforming configuration to the MIMO communication system.

4. The method of claim 3, wherein:
   determining the first set of analog tap configurations and determining the first beamforming configuration are performed during a first time interval; and
   the MIMO communication system is configured based on the initial beamforming configuration throughout the first time interval.

5. The method of claim 4, wherein, in response to providing information indicative of the first beamforming configuration to the MIMO communication system, the MIMO communication system is configured based on the first beamforming configuration.

6. The method of claim 3, wherein the initial beamforming objective function is not associated with the set of self-interference channels.

7. The method of claim 3, wherein:
   while determining the initial beamforming configuration, the plurality of analog taps are configured based on a set of predetermined calibration configurations; and
   the initial beamforming objective function is further associated with the set of self-interference channels.

8. The method of claim 1, wherein:
   each analog tap of the plurality comprises a respective scaler and a respective phase shifter; and
   the first set of analog tap configurations comprises, for each analog tap of the plurality, a respective scale parameter associated with the respective scaler and a respective phase parameter associated with the respective phase shifter.

9. The method of claim 8, wherein:
   the plurality of analog taps comprises a first subset of analog taps, wherein each analog tap of the first subset further comprises a respective delay; and
   the first set of analog tap configuration further comprises, for each analog tap of the first subset, a respective delay parameter associated with the respective delay.

10. The method of claim 1, further comprising, while the MIMO communication system targets the first set of UE for downlink communications and targets the second set of UE for uplink communications, after providing the information indicative of the first beamforming configuration to the MIMO communication system:
  while the MIMO communication system is configured based on the first beamforming configuration, at the interference cancellation system, determining a second set of analog tap configurations by performing a third optimum search, based on the first cancellation objective function, over the analog tap configuration parameter space;
  in response to determining the second set of analog tap configurations, configuring the plurality of analog taps based on the second set of analog tap configurations; and
  while the plurality of analog taps is configured based on the second set of analog tap configurations:
    determining a second beamforming configuration by performing a fourth optimum search, based on a second beamforming objective function, over the beamforming parameter space; and
    in response to determining the second beamforming configuration, providing information indicative of the second beamforming configuration to the MIMO communication system;
wherein:
  the first beamforming objective function is associated with a first weighted sum of a self-interference channels metric and a gain metric, wherein the first weighted sum defines a first weight ratio of a self-interference channels metric weight to a gain metric weight, wherein the self-interference channels metric is associated with the set of self-interference channels, wherein the gain metric is associated with the transmit gain and the receive gain;
  the second beamforming objective function is associated with a second weighted sum of the self-interference channels metric and the gain metric, wherein the second weighted sum defines a second weight ratio of the self-interference channels metric weight to the gain metric weight, wherein the second weight ratio is substantially greater than the first weight ratio.

11. The method of claim 1, further comprising, while the MIMO communication system targets a third set of UE for downlink communications and targets a fourth set of UE for uplink communications:
  at the interference cancellation system:
    determining a second set of analog tap configurations by performing a third optimum search, based on the first cancellation objective function, over the analog tap configuration parameter space; and
    in response to determining the second set of analog tap configurations, configuring the plurality of analog taps based on the second set of analog tap configurations;
  while the plurality of analog taps is configured based on the second set of analog tap configurations, determining a second beamforming configuration by performing a fourth optimum search, based on a second beamforming objective function, over the beamforming parameter space, wherein the second beamforming objective function is associated with:
    the set of self-interference channels;
    a transmit gain for transmissions from the MIMO communication system to the third set of UE; and
    a receive gain for transmissions from the fourth set of UE to the MIMO communication system; and
  in response to determining the second beamforming configuration, providing information indicative of the second beamforming configuration to the MIMO communication system.

12. The method of claim 1, wherein the plurality of analog taps comprises M+N analog taps, wherein M is the number of transmit elements of the MIMO communication system and N is the number of receive elements of the MIMO communication system.

13. The method of claim 12, wherein the number of analog taps in the plurality of analog taps is substantially less than $M*N$.

14. The method of claim 13, wherein the number of analog taps is less than $5\sqrt{M*N}$.

15. The method of claim 1, wherein the first beamforming configuration comprises a respective value for each of a set of transmit beamforming coefficients and receive beamforming coefficients associated with the MIMO communication system.

16. The method of claim 15, wherein performing the second optimum search comprises:
  optimizing the set of transmit beamforming coefficients based on the blocker channels of the set of self-interference channels and based on the transmit gain; and
  optimizing the set of receive beamforming coefficients based on the ACL channels of the set of self-interference channels and based on the receive gain.

17. The method of claim 1, wherein the first set of UE comprises a first plurality of UE.

18. The method of claim 1, wherein:
  the MIMO communication system comprises a plurality of transmit chains, each transmit chain of the plurality comprising a respective transmit element and a respective power amplifier (PA); and
  for each analog tap of the plurality, the analog tap is connected to a respective transmit chain between the transmit element and the PA.

19. The method of claim 18, wherein:
  the MIMO communication system further comprises a plurality of receive chains, each receive chain of the plurality comprising a respective receive element and a respective low-noise amplifier (LNA); and
  for each analog tap of the plurality, the analog tap is connected to a respective receive chain between the receive element and the LNA.

20. The method of claim 1, wherein:
  the MIMO communication system further comprises a plurality of receive chains, each receive chain of the plurality comprising a respective receive element and a respective low-noise amplifier (LNA); and
  for each analog tap of the plurality, the analog tap is connected to a respective receive chain between the receive element and the LNA.

* * * * *